(12) United States Patent
Torii

(10) Patent No.: US 8,045,425 B2
(45) Date of Patent: Oct. 25, 2011

(54) OPTICAL DISK APPARATUS AND OPTICAL PICKUP

(75) Inventor: Shinnosuke Torii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/349,276

(22) Filed: Jan. 6, 2009

(65) Prior Publication Data

US 2009/0175152 A1    Jul. 9, 2009

(30) Foreign Application Priority Data

Jan. 9, 2008 (JP) .................................. 2008-002165

(51) Int. Cl.
*G11B 7/00*    (2006.01)

(52) U.S. Cl. .................................. 369/44.14; 369/112.01

(58) Field of Classification Search ........................ None
See application file for complete search history.

(56) References Cited

U.S. PATENT DOCUMENTS

| 2005/0249055 A1* | 11/2005 | Ochi et al. ................. 369/44.14 |
| 2005/0281142 A1* | 12/2005 | Ochi et al. ................. 369/44.14 |
| 2006/0193222 A1 | 8/2006 | Torii ........................... 369/47.23 |
| 2007/0171806 A1* | 7/2007 | Wade et al. .................... 369/121 |
| 2008/0074962 A1* | 3/2008 | Toyoda et al. .............. 369/44.11 |
| 2009/0122685 A1 | 5/2009 | Torii ........................ 369/112.01 |

FOREIGN PATENT DOCUMENTS

| JP | 2002-373440 | 12/2002 |
| JP | 2006-147032 | 6/2006 |

* cited by examiner

*Primary Examiner* — Lixi C Simpson
(74) *Attorney, Agent, or Firm* — Fitzpatrick, Cella, Harper & Scinto

(57) ABSTRACT

An optical disk apparatus includes a light source that emits a light flux. A light source drive circuit causes the light source to emit the light flux. An optical base has an optical system disposed thereon. The optical system includes an objective lens for guiding the light flux emitted from the light source to a disk-shaped recording medium. A moving mechanism moves the optical base. A first heat radiation member is connected to the light source, and a second heat radiation member is connected to the light source drive circuit and is different from the first heat radiation member. The first heat radiation member and the second heat radiation member are provided so as to face the disk-shaped recording medium. The first heat radiation member is disposed on the disk-shaped recording medium side with respect to the second heat radiation member, and the first heat radiation member has a hole provided therein, for exposing the second heat radiation member to the disk-shaped recording medium.

14 Claims, 19 Drawing Sheets

134

134

134

HIGH
TEMPERATURE
↑

↓
LOW
TEMPERATURE

134

134

134

HIGH TEMPERATURE

LOW TEMPERATURE

OPTICAL DISK APPARATUS AND OPTICAL PICKUP

This application claims the benefit of Japanese Patent Application No. 2008-002165, filed Jan. 9, 2008, which is hereby incorporated by reference herein in its entirety.

BACKGROUND OF THE INVENTION

1. Field of the Invention

The present invention relates to a semiconductor laser in an information recording/reproducing apparatus using an optical disk, and to a countermeasure for heat radiation for a drive circuit of a semiconductor laser.

2. Description of the Related Art

A semiconductor laser (hereafter, simply referred to as an "LD"), which is a light source of an optical disk apparatus, is well known for posing various problems due to temperature rise, such as shortening of lifetime, degradation of signal quality involved in an increase of quantum noise, and lowering of a slope efficiency showing a relation between a drive current and an emission efficiency.

Further, an LD and a driver for driving an LD (hereafter, simply referred to as an "LDD") are connected to each other on an electrical circuit board, and are generally subjected to an influence of an electrical noise as the distance therebetween becomes larger, whereby the degradation of the signal quality occurs. As a result, in order to improve the signal quality, it is necessary to dispose the LD and the LDD as close to each other as possible, on an optical pickup to be described later.

However, on the optical pickup, an LD and an LDD are main heat generating sources. Therefore, when the LD and the LDD are disposed close to each other, heat is transferred therebetween to thereby accelerate the temperature rise of each of the components.

Furthermore, in recent years, it has been necessary to reduce the size and the thickness of the optical disk apparatus. This requirement is especially remarkable in the field of mobile applications, such as disk camcorders that have been commercialized recently, in which components, such as an optical disk apparatus and an electrical board, are accommodated in an outer package of a product at a high density. Accordingly, the temperature rise of the optical disk apparatus is prompted, whereby a temperature rise of the LD is generated.

Furthermore, the components themselves must be reduced in the size and thickness thereof, which causes degradation of the heat radiation performance, involved in the lowering in the heat capacity of the components.

As described above, temperature environments surrounding an LD have become worse and worse. Therefore, it is necessary to improve the conflicting functions described above of "taking a countermeasure against electrical noise and reducing a thermal influence between heat generating sources" and of "reducing the sizes of components themselves and improving the heat radiation performance" at the same time.

As the technology for accomplishing the tasks described above, two conventional technologies are exemplified as follows.

First Conventional Example

As a first conventional example, there is exemplified Japanese Patent Application Laid-Open No. 2002-373440. The outline of this device is described with reference to FIGS. 17 and 18. FIG. 17 is a perspective view illustrating a developed state of a heat radiation mechanism, and FIG. 18 is a perspective view illustrating an assembly completed state thereof.

A semiconductor laser 4, serving as a first heat generating source, is held in a laser holder 5, and the semiconductor laser 4 and the laser holder 5 are incorporated into a housing 1, which constitutes a structural base. In addition thereto, a heat radiating plate 8 installed on a laser driver 6, serving as a second heat generating source, is mounted to the housing 1. Then, a heat transmitting member 16 is interposed between the laser holder 5 and the heat radiating plate 8, to thereby thermally bond the semiconductor laser 4 to the heat radiating plate 8. In this way, the heat of the two heat generating sources is radiated with the use of the single heat radiating plate 8.

Second Conventional Example

Next, as a second conventional example, there is exemplified Japanese Patent Application Laid-Open No. 2006-147032. FIG. 19 is a view illustrating the outline of an optical disk apparatus. In this conventional example, at least one of a laser device 22 and a driver device 23, serving as heat generating sources, is provided so as to be exposed over an area moving together with a base 25 in a radial direction of a disk-shaped recording medium 21, on a virtual plane side including a holding surface 32, on which the disk-shaped recording medium 21 is mounted. When the disk-shaped recording medium 21 is rotated, an atmospheric gas of the disk-shaped recording medium 21 flows. Between the disk-shaped recording medium 21 and at least one of the laser device 22 and the driver device 23 to be exposed on the virtual plane side including the holding surface 32, there is nothing that blocks the flow of the atmospheric gas of the disk-shaped recording medium 21. Therefore, when the atmospheric gas of the disk-shaped recording medium 21 flows, an atmospheric gas of the at least one of the laser device 22 and the driver device 23 to be exposed on the virtual plane side, including the holding surface 32, will be diffused. In this way, the heat of the heat radiating sources is radiated by using air-cooling caused by the rotation of the disk-shaped recording medium 21. Incidentally, FIG. 19 is, of the second conventional example described above, a schematic view illustrating a case in which only the laser device 22 is exposed. Descriptions of a case wherein the driver device 23 is exposed and a case wherein both the laser device 22 and the driver device 23 are exposed are omitted.

However, the following problems have been posed in the conventional examples described above.

In the first conventional example, the heat is transmitted from the two heat generating sources to the one and the same component, whereby lowering of the temperatures of the heat generating sources is to be attained. However, the heat capacity of the heat radiating component is reduced due to the size reduction of components accompanying the size reduction of the optical disk apparatus, which causes saturation of the heat quantity, with the result that the heat radiation of the LD and the LDD with only the one component cannot provide a sufficient effect. Particularly, in recent years, light sources have been provided with a higher power so as to support optical disks having multiple recording layers or to perform recording and reproducing at a high transfer rate. Thereby, the power consumption of the LD and the LDD has increased and the temperature rise is also prompted. Therefore, in order to realize a sufficient heat radiation performance by the conventional technologies described above, the heat radiating component is required to be made larger in size. This is because, when temperature distributions of the respective heat generating sources interfere with each other, the heat radiation performance by the heat radiation member will be reduced.

Therefore, in the case of employing the technology of the first conventional example, also in the structure illustrated in, for example, FIG. 18, it is necessary to make the distance between the LD and the LDD larger, and to make the heat radiating plate 8 larger in size. With this structure, the protrusion of an optical pickup on a disk projection surface is made greater, resulting in making the device larger in size.

Furthermore, because of the problem of the electrical noise described above, it is generally desirable to set the distance between the LD and the LDD smaller. For that reason, in the case wherein the technology of the first conventional example is employed while maintaining the signal quality, a problem has arisen that a sufficient heat radiation effect cannot be obtained.

In the second conventional example, by exposing the heat generating source itself on the disk-shaped recording medium 21 side, the air-cooling caused by the rotation of the disk-shaped recording medium 21 is utilized, to thereby reduce the temperature rise of the heat generating source.

However, as described above, in general, the heat capacities of only the LD and the LDD are small, and their outer shapes themselves are also small. Therefore, with regard to the heat generation involved in the increase in recent years of power consumption of the above-mentioned LD and LDD, a sufficient air-cooling effect may not be obtained, because the respective devices have small surface areas with respect to the flowing air. In this case, the thermally saturated LD and LDD cause the heat distributions thereof to interfere with each other through the base 25, with the result that the temperatures of the respective heat generating sources are increased.

Furthermore, in general, the air-cooling effect for the optical pickup due to the rotation of the optical disk is most lowered when an objective lens of the optical pickup is positioned on the outermost periphery of the optical disk. This is because a portion of the optical pickup protruding from the disk projection surface of the optical disk is increased, and, therefore, the air-cooling effect cannot be obtained. As a matter of course, this is not caused when a specific cooling mechanism, such as a cooling fan, is provided, but enlargement in size of the apparatus may be caused.

In the second conventional example, countermeasures for the above-mentioned problems, while ensuring the size reduction of the apparatus, are not explicitly described. Further, it can clearly be seen from FIG. 19 that when positioned on the outermost periphery of the optical disk, the heat generating sources are greatly deviated from the disk projection surface.

SUMMARY OF THE INVENTION

It is, therefore, an object of the present invention to provide an optical disk apparatus that can improve the heat radiation performance of a light source without increasing the size or thickness of the apparatus.

In order to achieve the above-mentioned object, the following device is provided.

An optical disk apparatus includes a light source, a light source drive circuit for allowing the light source to emit a light flux, an optical base having an optical system disposed thereon, the optical system including an objective lens for guiding the light flux emitted from the light source to a disk-shaped recording medium, a moving mechanism for moving the optical base, a first heat radiation member connected to the light source, and a second heat radiation member connected to the light source drive circuit and being different from the first heat radiation member.

According to the configuration of the present invention, the heat radiation performance of a light source can be improved without increasing the size or the thickness of an optical disk apparatus, compared with conventional apparatuses. With this configuration, the temperature rise of the light source can be reduced, and, therefore, an optical disk apparatus can be provided in which the lifetime of the light source is prolonged, degradation of the signal quality is reduced by suppressing an increase in quantum noise, and lowering of the slope efficiency is reduced.

Further features of the present invention become apparent from the following description of exemplary embodiments, with reference to the attached drawings.

DESCRIPTION OF THE EMBODIMENTS

A detailed description is made hereafter of an embodiment of the present invention, with reference to the drawings.

Embodiments

Figure 1:
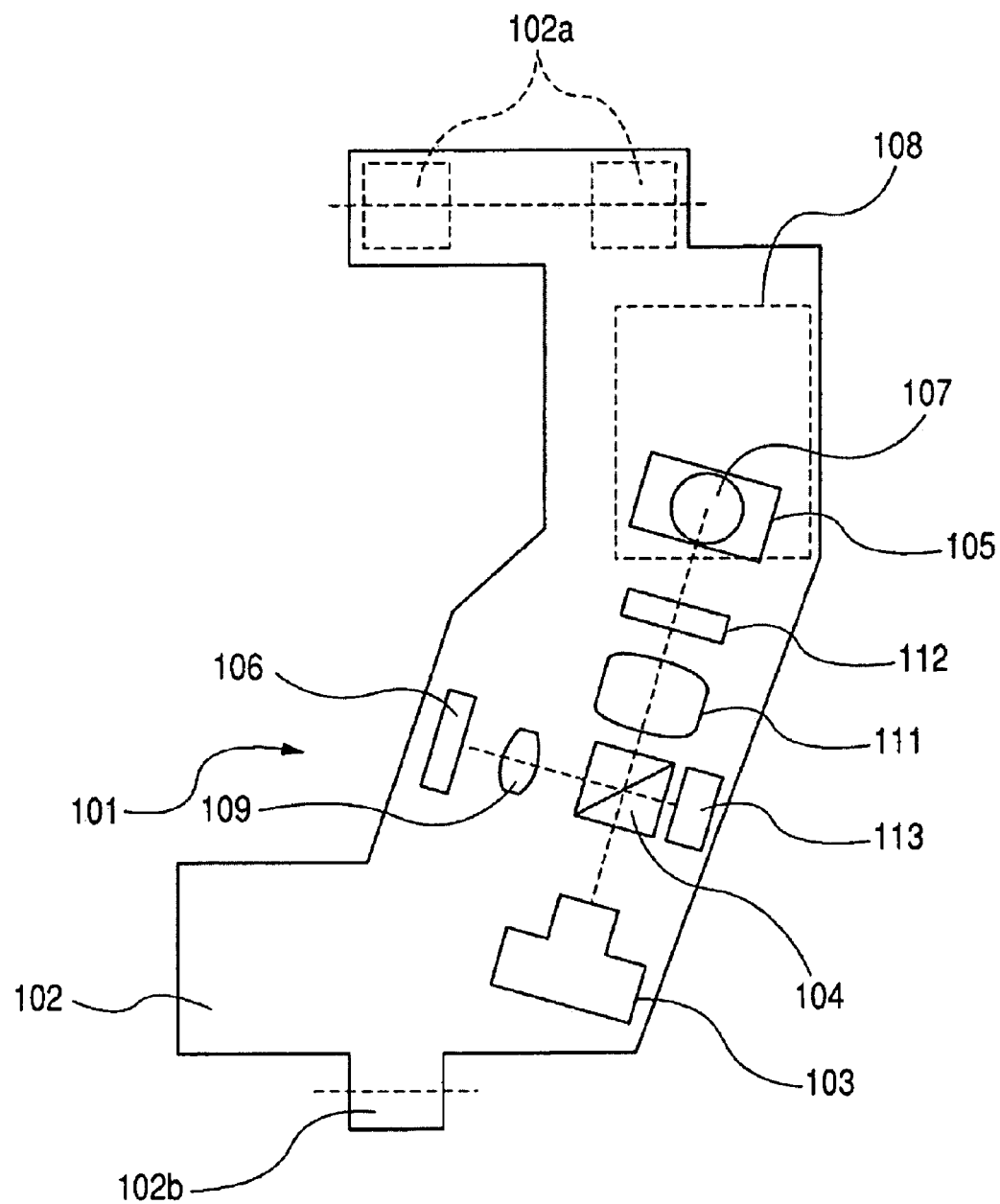
FIG. 1 is a conceptual view of an optical pickup for illustrating an optical system in accordance with an embodiment of the present invention.

First, an optical system of an optical pickup 101 is described with reference to FIG. 1. Incidentally, FIG. 1 is a conceptual view in which the optical pickup 101 described below is simplified for description of the optical system.

An optical base 102, which is a base of the optical pickup 101, is provided with a semiconductor laser (LD) 103, serving as a light source, a polarizing beam splitter 104 serving as a splitter, a collimator 111, a quarter wavelength plate 112, a deflecting mirror 105, and an RF servo sensor 106, serving as a light receiving device. Furthermore, there are disposed an objective lens actuator 108, which supports an objective lens 107, so as to be capable of biaxially driving the objective lens 107 in a focusing direction and a tracking direction with respect to recording tracks of an optical disk 110, serving as a disk-shaped recording medium, a sensor lens 109, and a monitor sensor 113. Incidentally, as the structure of the objective lens actuator 108, there may be used a well-known structure, for example, a four-wire system. Therefore, a description thereof is omitted.

Further, as a moving mechanism for moving the optical base 102, the optical base 102 is provided with a main shaft bearing 102a and a sub-shaft bearing 102b, which are integratedly formed and into which two guide shafts of an optical disk apparatus described below are respectively fit. With this structure, the optical base 102 is formed to be slidable along the guide shafts.

A light flux emitted from the LD 103 as a divergent light enters the polarizing beam splitter 104 to be split into a reflected light and a transmitted light. The light flux reflected by the polarizing beam splitter 104 enters the monitor sensor 113 to thereby generate a monitor output signal for controlling an output of the LD 103.

On the other hand, the light flux transmitted through the polarizing beam splitter 104 is made to be parallel light by the collimator 111. The light flux transmitted through the collimator 111 is reflected perpendicularly to a disk surface of the mounted optical disk 110 by the deflecting mirror 105 through the quarter wavelength plate 112 to thereby enter the objective lens 107. The light flux that has entered the objective lens 107 forms an image on an information recording layer (not shown) on the optical disk 110, whereby recording of the information is performed.

Further, the light flux reflected by the optical disk 110 is collected by the objective lens 107 and reflected by the polarizing beam splitter 104. The light flux reflected by the polarizing beam splitter 104 enters the RF servo sensor 106 serving as a light receiving device through the sensor lens 109. Thereby, information signals are reproduced and focusing and tracking servo error signals are generated. Incidentally, as the servo method, a well-known method (for example, focus servo: astigmatic method, and tracking servo: push-pull method) may be used, and, therefore, a description thereof is omitted.

Next, the optical disk apparatus is described with reference to FIG. 2.

Figure 2:
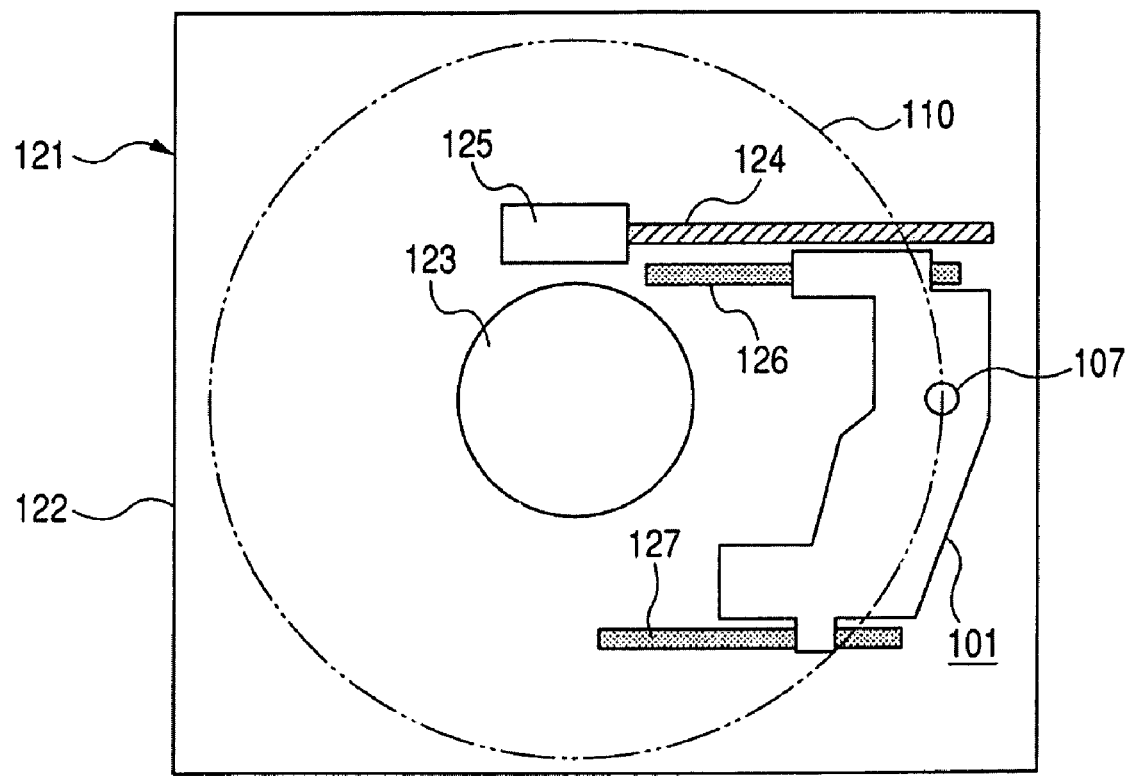
FIG. 2 is a schematic view illustrating an optical disk apparatus in accordance with an embodiment of the present invention.

Incidentally, in FIG. 2, respective components are depicted in a simple manner as with those in FIG. 1. Furthermore, in FIG. 2, the center of the objective lens 107 of the optical pickup 101 is located at the outermost periphery of the recording track of the optical disk 110.

On a chassis 122 to serve as a structural base, a spindle motor 123 for mounting and rotating the optical disk 110 is disposed. In addition, there are disposed a feed motor 125, which is a stepping motor, including a lead screw 124 for transferring the optical pickup 101 in a radial direction of the optical disk 110, and a main shaft 126 and a sub-shaft 127 serving as guide shafts for supporting the optical pickup 101. In this manner, an optical disk apparatus 121 is formed.

A light flux is emitted from the objective lens 107 of the optical pickup 101 with respect to the optical disk 110 rotated by the spindle motor 123. Further, the lead screw 124, which is integratedly formed with a rotational axis of the feed motor 125, and the optical pickup 101, are engaged with each other by a rack member (not shown). A rotational movement of the lead screw 124 is converted into a translational movement to thereby move the optical pickup 101 in the disk radial direction with the use of the main shaft 126 and the sub-shaft 12 as guides. With this structure, information recording/reproducing are performed from the inner periphery of the optical disk 110 to the outer periphery thereof.

Hereafter, the characteristic features of the present invention are described.

Figure 3A:
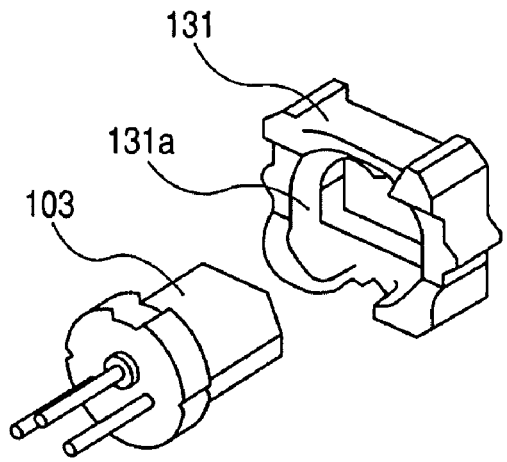
FIGS. 3A, 3B and 3C are views illustrating structures of a semiconductor laser (LD) and an LD holder in accordance with an embodiment of the present invention.
Figure 3B:
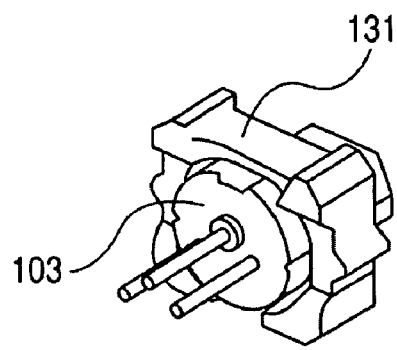
Figure 3C:
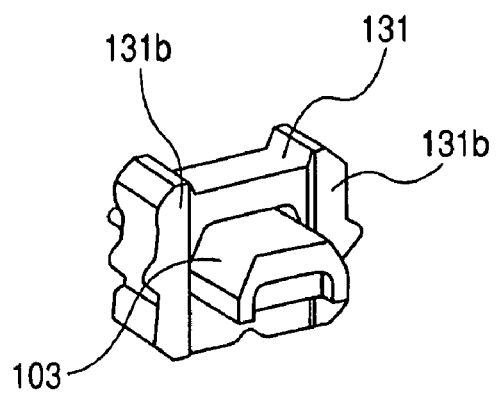

FIGS. 3A to 3C are perspective views illustrating the detailed structures of the LD 103 serving as a first heat generating source and an LD holder 131 serving as a heat radiation member. FIG. 3A is a developed perspective view of the LD 103 and the LD holder 131, viewed from the back side. FIG. 3B is a perspective view illustrating a state after assembly, viewed from the back side. FIG. 3C is a perspective view illustrating the state after assembly, viewed from the front side.

The LD 103 is installed in a central processed portion 131a of the LD holder 131, which is formed so as to cover the outer shape of the LD 103, thereby being fixed with an adhesive agent, or the like. In this embodiment, in order to enhance the heat radiation performance, a metal material, such as a zinc die-cast, or copper, is used for the LD holder 131. Further, as described above, the LD holder 131 is formed so as to cover the outer shape of the LD 103, thereby enhancing the thermal connection between the two components. Incidentally, in addition to the adhesive agent, a thermally conductive grease, or the like, can be separately used to transmit the heat of the LD 103 to the LD holder 131.

Figure 4:
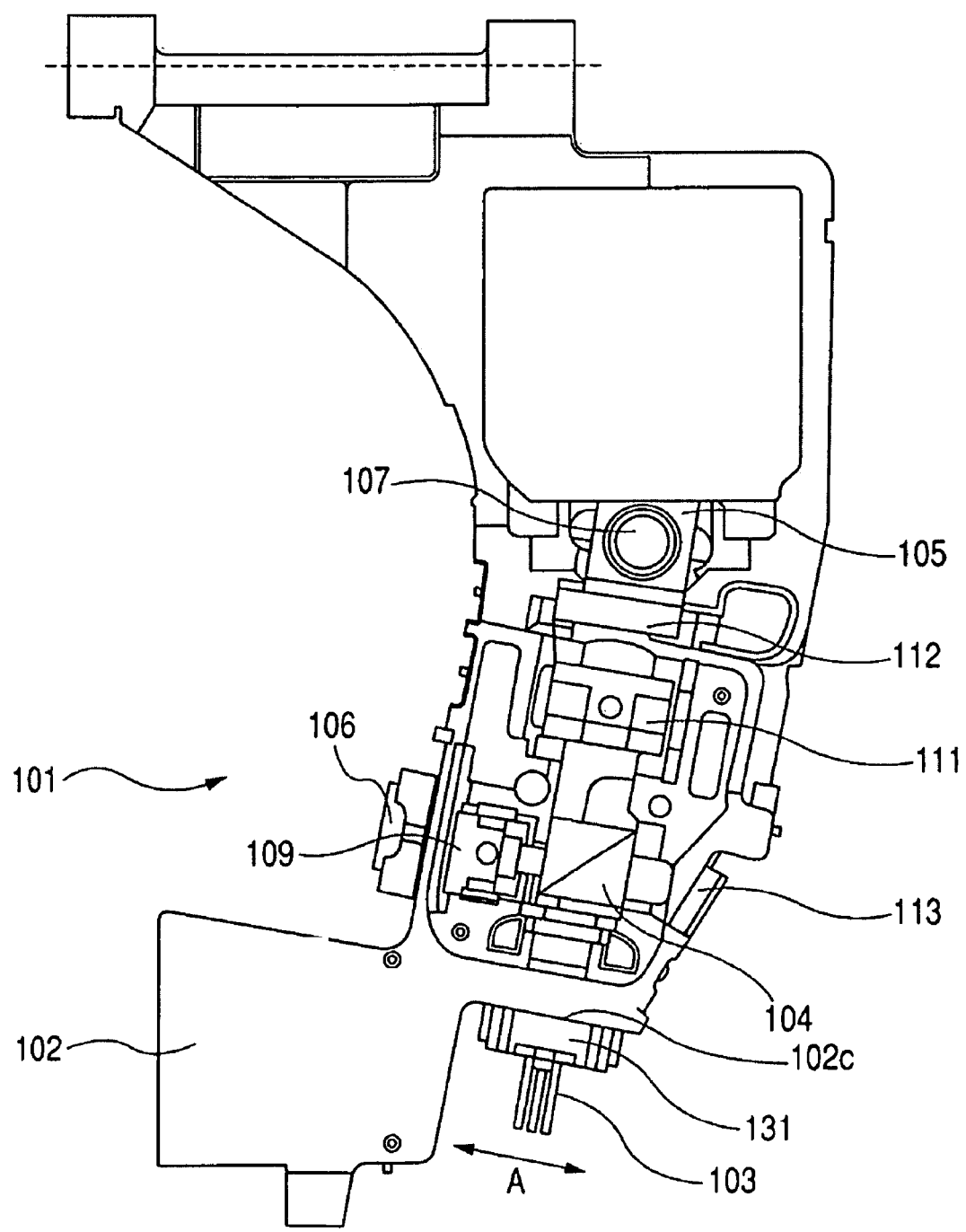
FIG. 4 is a first front view of an optical pickup from which a portion of the components is removed in accordance with an embodiment of the present invention.

FIG. 4 is a first detailed front view of the optical pickup 101 illustrated in FIG. 1. Incidentally, the objective lens actuator 108 is omitted from FIG. 4 for simplification of the description. Further, detailed front views of FIG. 4 and the subsequent figures illustrate the states wherein a portion of the components is removed from the optical pickup 101 of a complete state, for the description of the present invention. Accordingly, the figures illustrate states different from those in the actual assembly steps.

As illustrated in FIG. 4, an optical base abutting surface 131b of the LD holder 131 illustrated in FIG. 3C is made to abut on and to be bonded to an LD holder abutting surface 102c of the optical base 102, whereby the position of the LD 103 is fixed with respect to the optical base 102. Incidentally, in the actual assembly, at least one of the position of the light source and the inclination thereof is generally adjusted. For example, in this embodiment, the LD holder 131 is moved parallel to a direction of the arrow A of FIG. 4 and the focusing direction, whereby the position of the light source is adjusted. For other adjustments, there can be provided a mechanism for adjusting the inclination of the light source and a mechanism for adjusting both the position and the inclination. Incidentally, the adjustments of the position and the inclination of the light source are well-known technologies, and, therefore, detailed descriptions thereof are omitted. The other optical components, and the like, are arranged as described in detail in FIG. 1, and are fixed to the optical base 103 with an adhesive agent, or the like, after the positions and the inclinations thereof are adjusted.

Figure 5:
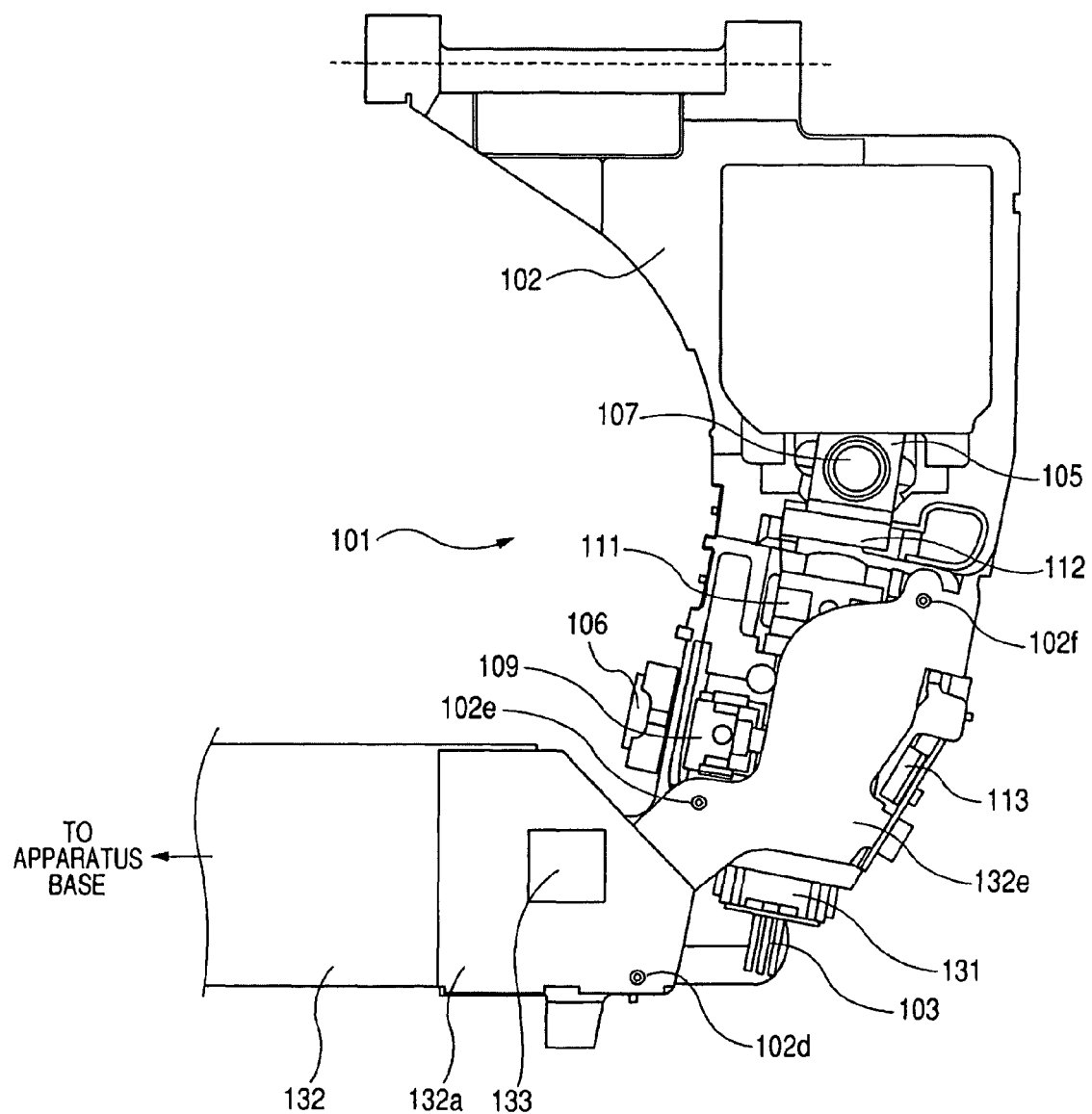
FIG. 5 is a second front view illustrating a state in which a flexible printed circuit board (FPC) is mounted to the optical pickup of FIG. 4.

FIG. 5 is a second detailed front view of a state wherein a flexible printed circuit board (hereafter, simply referred to as an "FPC") 132 is mounted to the optical pickup 101 illustrated in FIG. 4.

The FPC 132 is a component for transmitting an electrical signal to the LD 103, the RF servo sensor 106, the objective lens actuator 108, and the monitor sensor 113, which are mounted to the optical pickup 101, and for transmitting a signal output from the RF servo sensor 106 and the monitor sensor 113 to an apparatus base (not shown). Incidentally, in the FPC 132 illustrated in FIG. 5, only the portions relating to the present invention are extracted and illustrated, for convenience of description. Further, as illustrated in FIG. 5, a semiconductor laser driver (LDD) 133, which is a light source drive circuit for driving the LD 103, is mounted to the FPC 132. The LDD 133 is a second heat generating source. The FPC 132 is positioned by using pin portions 102d, 102e, and 102f integratedly formed with the optical base 102 illustrated in FIG. 5, as guides for positioning, and then, fixed to the optical base 102 with a two-sided adhesive tape previously arranged on the FPC 132 or by fastening of screws (not shown). After that, with the use of solder, electrical conduction of the FPC 132 with the LD 103, the RF servo sensor 106, the objective lens actuator 108, and the monitor sensor 113 is assured. Incidentally, in this embodiment, after the FPC 132 is assembled to the optical base 102, soldering is performed, as described above. However, for example, it is possible to mount the RF servo sensor 106 to the FPC 132 in advance, and then, to adjust positions after the FPC is assembled, and to bond and to fix the RF servo sensor 106 to the optical base 102.

Figure 6:
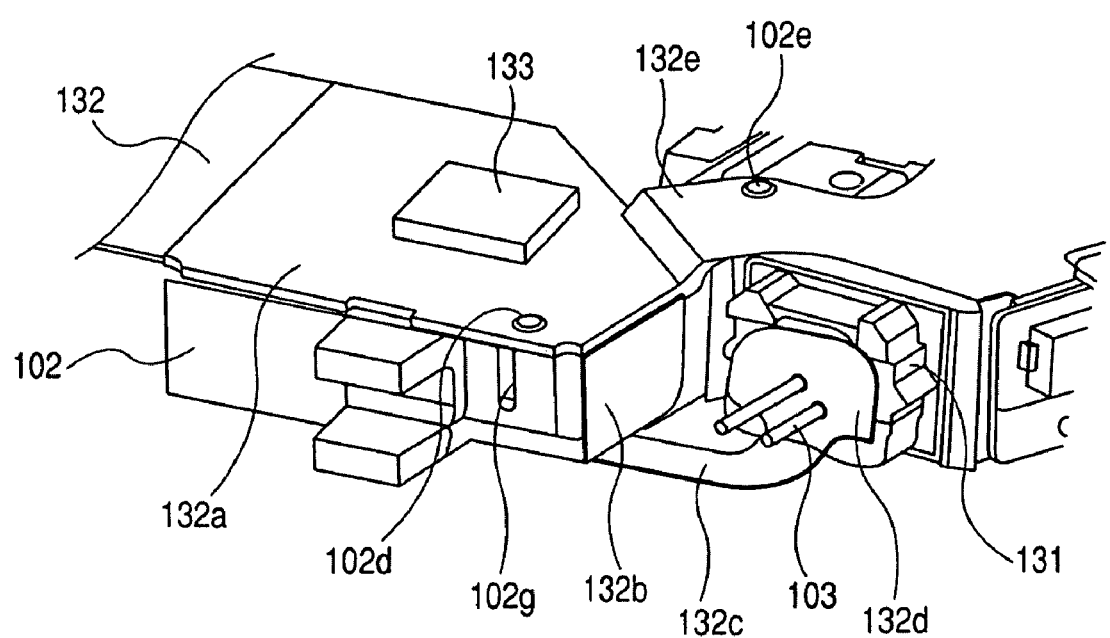
FIG. 6 is an enlarged perspective view illustrating a vicinity of the LD and a semiconductor laser driver (LDD) of the optical pickup of FIG. 5.

FIG. 6 is an enlarged perspective view of a portion of the optical pickup 101 in the state illustrated in FIG. 5, for the description of the conduction between the LDD 133 and the LD 103. An LDD mounting portion 132a of the FPC 132 having the LDD 133 mounted thereto is formed so as to be located between the LDD 133 and the optical base 102. Further, a portion of the LDD mounting portion 132a is arranged along a side wall of the optical base 102 as a first LD conductive portion 132b. Then, the FPC 132 reaches a third LD conductive portion 132d through a second LD conductive portion 132c, thereby being fixed while assuring the electrical conduction with three terminal portions of the LD 103 and with the solder. Further, in the LDD mounting portion 132a, there are arranged a conductive portion for transmitting an electrical signal therefrom to the RF servo sensor 106 (not shown), and an ACT monitor conductive portion 132e for transmitting an electrical signal therefrom to the objective lens actuator 108 side and the monitor sensor 113 side. As is also apparent from FIG. 5, the ACT monitor conductive portion 132e is arranged so as to cover an upper surface side of the optical base 102 in the vicinity of the LD 103, particularly, in a disk projection surface.

Figure 7:
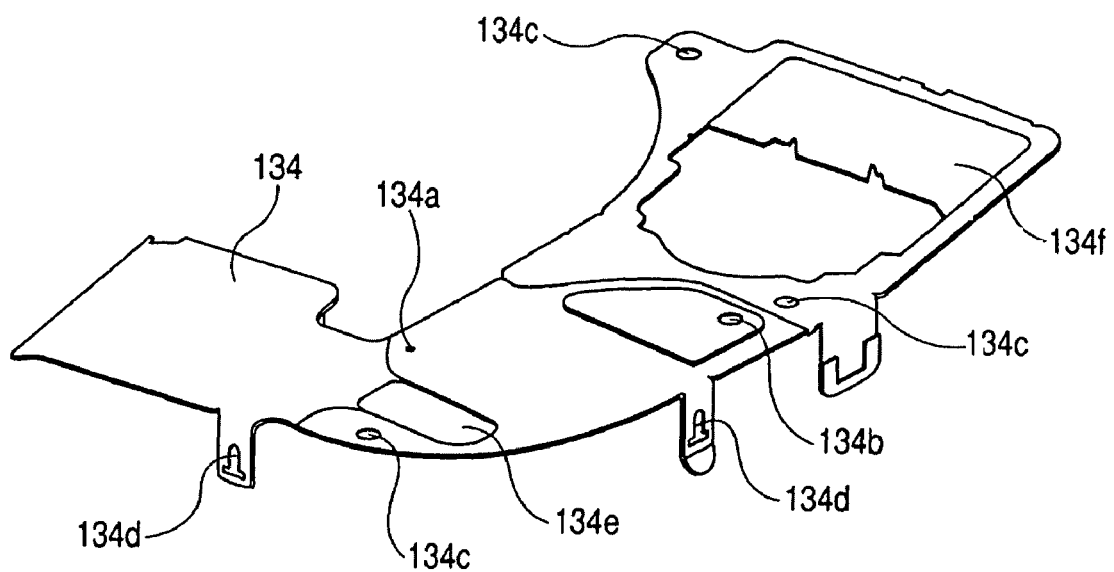
FIG. 7 is a perspective view of a main cover in accordance with an embodiment of the present invention.

FIG. 7 is a perspective view of a main cover 134 serving as a second heat radiation member. The main cover 134 in this embodiment is formed by pressing a stainless sheet metal. Optical base positioning holes 134a and 134b are respectively fit into the pin portions 102e and 102f of the optical base 102 to perform positionings, as is the case with the FPC 132. An optical base hooking hole portion 134d is provided to be engaged with a main cover hooking convex portion 102g of the optical base 102 illustrated in FIG. 6, to thereby be fixed. A window portion 134e is provided to the main cover 134 to form a hole.

Figure 8:
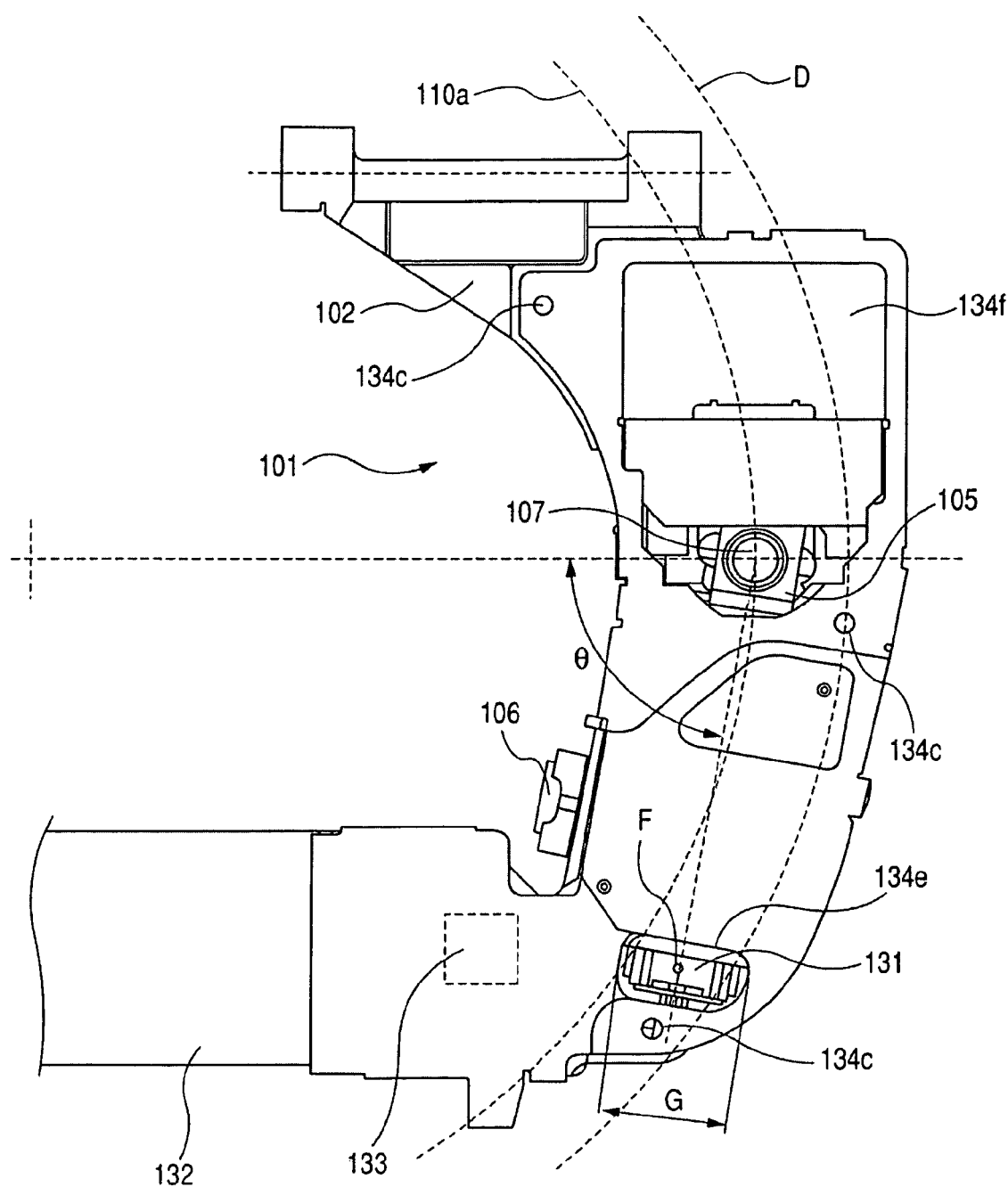
FIG. 8 is a third front view illustrating a state in which a main cover is mounted to the optical pickup of FIG. 5.

FIG. 8 is a third detailed front view of a state in which the main cover 134 is mounted to the optical pickup 101 illustrated in FIG. 5. Furthermore, FIG. 9 is a side view of the above-mentioned state viewed from a sub-shaft 127 side.

Figure 9:
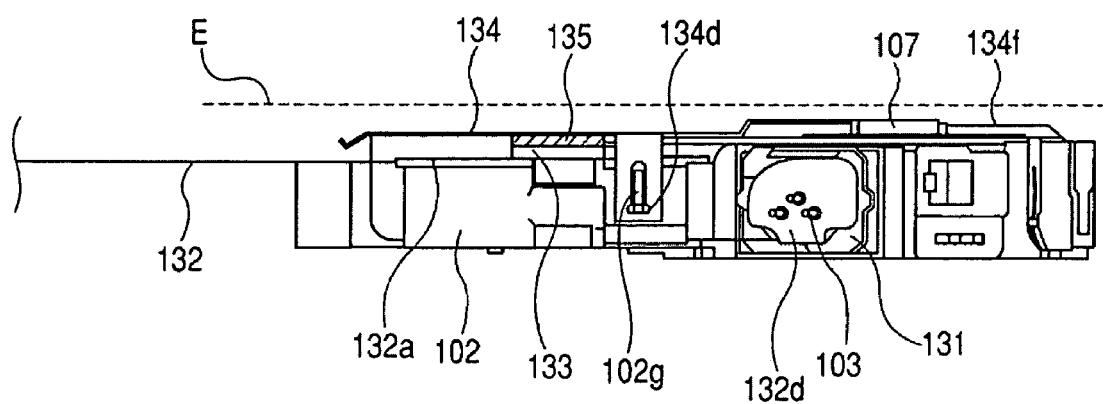
FIG. 9 is a side view of the optical pickup of FIG. 8.

A thermal conductive sheet 135, illustrated as a shaded area in FIG. 9, is disposed on the LDD 133, and the pin portions 102e and 102f of the optical base 102 are aligned with the optical base positioning holes 134a and 134b of the main cover 134, whereby the main cover 134 is located on the optical base 102.

The thermal conductive sheet 135 has the same outer shape as that of the LDD 133 in the front view illustrated in FIG. 8, and is located just above the LDD 133. Incidentally, in this embodiment, a thermal conductive sheet made of silicon rubber is used. With this structure, the thermal connection between the LDD 133 and the main cover 134 is suitably realized while absorbing, by expansion and contraction of the rubber, height variations due to the assembly of the main cover 134 and the LDD 133, to be described later, or component variations. Incidentally, while in this embodiment, the thermal conductive sheet 135 made of silicon rubber was used, the present invention is not limited thereto. For example, a grease-like thermal conductive member, such as a silicon grease, can be used, or the thermal conductive member itself can be omitted. In the case wherein the thermal conductive member is omitted, for example, the main cover 134 is provided with a plate spring portion or a protruding portion by drawing, so as to have a protruding shape on the LDD 133 side, and the main cover 134 is biased toward the LD 133, whereby the thermal connection between the LDD 133 and the main cover 134 can be suitably realized.

Next, the main cover hooking convex portion 102g of the optical base 102 described above and the optical base hooking hole portion 134d of the main cover 134 are engaged with each other, whereby the main cover 134 is fixed to the optical base 102 by a method such as screwing or bonding (not shown).

Incidentally, while FIG. 6 illustrates only one main cover hooking convex portion 102g of the optical base 102, because FIG. 6 is an enlarged view, the main cover hooking convex portions 102g are provided to portions corresponding to the optical base hooking hole portions 134d illustrated in FIG. 7. Further, FIG. 7 illustrates only the optical base hooking hole portions 134d on the outer periphery side of the optical disk 110. However, in reality, the same fixing structure is provided to the optical base 102 and the main cover 134 on the inner periphery side and the main shaft 126 side. With this structure, a floating state of the main cover 134 from the optical base 102 is prevented.

The structure in the vicinity of the heat generating sources described above in detail is described below again.

The LD 103, serving as the first heat generating source, is firmly fixed to the LD holder 131, serving as the first heat radiation member, and the LD holder 131 is fixed to the optical base 102. In this case, the LD holder 131 is fixed so that an upper surface of the LD holder 131 of FIG. 6 faces the optical disk 110 to be mounted.

On the other hand, the LD 133, serving as the second heat generating source, is mounted on the LDD mounting portion 132a of the FPC 132 disposed on the optical base 102. In this case, the LDD 133 of FIG. 6 is mounted so as to face the optical disk 110 to be mounted. Further, the thermal conductive sheet 135 is mounted on the LDD 133, and the main cover 134, serving as the second heat radiation member, is disposed in close contact with the thermal conductive sheet 135.

Further, in general, the FPC 132 is formed of a material such as polyimide, and this applies to this embodiment as well. In this embodiment, the advantage of the polyimide having a low thermal conductive performance is used, so that the FPC 132 also serves as a heat insulating material.

Specifically, as described above, the FPC 132 is disposed between the LDD 133, serving as the second heat generating source, and the optical base 102, whereby the thermal conductive performance with respect to the optical base 102 is reduced, and the temperature rise of the optical base 102 is suppressed.

Furthermore, in the disk projection surface, as described above, the ACT monitor conductive portion 132e of the FPC 132 is disposed on the upper surface side of the optical base 102 in the vicinity of the LD 103, and thereon, the main cover 134 is disposed. With this structure, the temperature of the main cover 134, serving as the second heat radiation member, is increased, which allows the temperature rise of the optical base 102 to be suppressed. In addition, as is clearly seen from FIG. 8, the window portion 134e is formed so as to expose most of the LD 103 and the LD holder 131. With this structure, the thermal conduction due to radiation of the LD holder 131, serving as the first heat radiation member, and the main cover 134, serving as the second radiating member, is reduced.

With the structure described above, the thermal interference between the LD 103, serving as the first heat generating source, and the LD 133, serving as the second heat generating source, is avoided.

Here, results of comparison with the first conventional example are described with reference to FIGS. 10A to 10C and 11A to 11C.

Figure 10A:
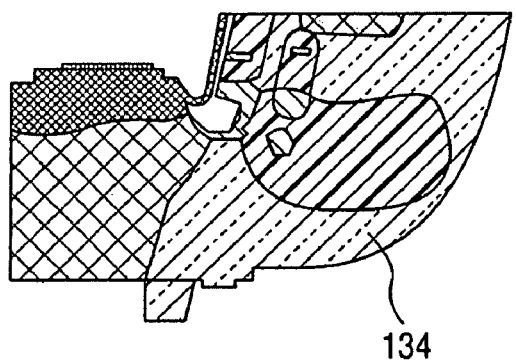
FIGS. 10A, 10B and 10C are diagrams illustrating analysis results of heat distribution in a state in which a window portion of the main cover is removed from the optical pickup of FIG. 8.
Figure 10B:
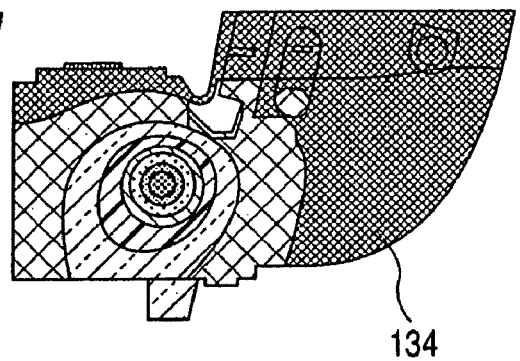
Figure 10C:
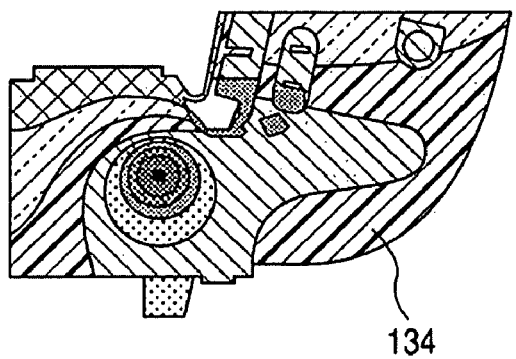

FIGS. 10A to 10C are analysis results of heat distribution viewed from the optical disk 110 side, in the case wherein, in the optical pickup 101 illustrated in FIG. 8, the window portion 134e of the main cover 134 is removed so as not to expose the LD holder 131, and the LD 103 and the LDD 133 are provided to serve as the heat generating sources.

Figure 11A:
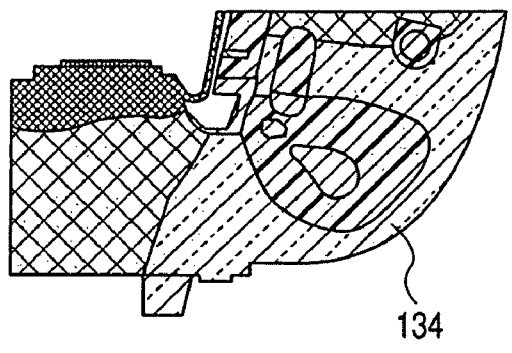
FIGS. 11A, 11B and 11C are diagrams illustrating analysis results in a case wherein the LD and the main cover are thermally connected to each other, for comparison with the case of FIGS. 10A to 10C.
Figure 11B:
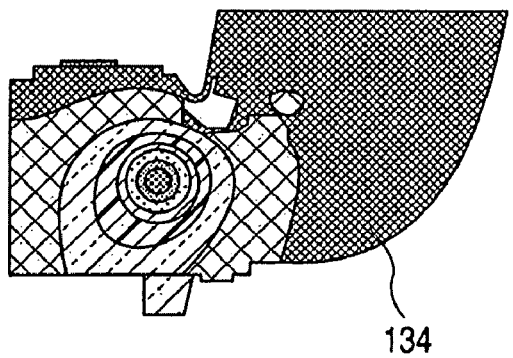
Figure 11C:
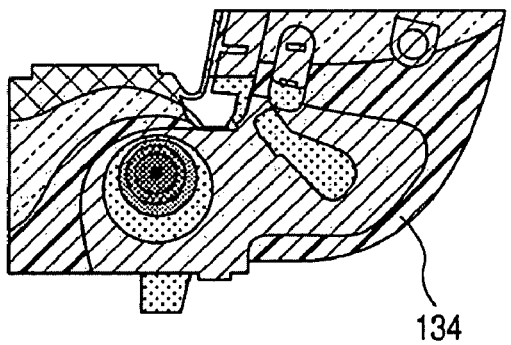

Further, FIGS. 11A to 11C are analysis results of a case wherein, the optical pickup 101 illustrated in FIGS. 10A to 10C, a thermal conductive member (not shown) having the same specifications as those of the thermal conductive sheet 135 is also disposed between the LD holder 131 and the main cover 134, and both the heat generating sources are thermally connected to the main cover 134.

Furthermore, FIGS. 10A and 11A illustrate a case wherein only the LD 103 generates heat, FIGS. 10B and 11B illustrate a case wherein only the LDD 133 generates heat, and FIGS. 10C and 11C illustrate a case wherein both the LD 103 and the LDD 133 generate heat.

Incidentally, in this analysis, in order to simplify the analysis, a portion of the configuration is simplified, for example, a gap between the pin portion 102e of the optical base 102 and the optical base positioning hole 134a of the main cover 134 is omitted.

Incidentally, in the analysis described above, an optical disk 110 with a DVD format is assumed to be used as a specific example, and the optical disk 110 is rotated at double speed. Further, the heat generation amount of each of the heat generating sources is set in consideration of that at the time of information recording. Table 1 below shows specific heat generation amounts used in this analysis.

TABLE 1

| component | heat generation amount [mW] |
|---|---|
| LD | 270 |
| LDD | 100 |

Further, the analysis is performed on the assumption of a state wherein the optical pickup 101 is located at the outermost periphery of the recording track of the optical disk 110 having a diameter of 80 mm, as illustrated in FIG. 8 with the two-dot chain line 110a. This is because, under the above-mentioned condition, the portion where the optical pickup 101 is exposed from a projection area of the optical disk 110 is largest, and, therefore, the air-cooling effect due to rotation of the disk is lowest, which most accelerates the temperature rise of the LD 103.

Furthermore, in the thickness direction of the optical pickup 101, a surface of the objective lens 107 side (hereafter, referred to as a "disk lower surface"), of the optical disk 110, is located at a position indicated with the alternate long and short dash line E of FIG. 9. In the case wherein a thin optical pickup is formed, it is required to minimize a shortest distance between the disk lower surface and the optical pickup 101, excluding the objective lens actuator 108. However, for example, in view of axial deflection in the focusing direction due to the rotation of the optical disk 110, a clearance is required to be assured so that the disk lower surface and the optical pickup 101 do not collide with each other due to the rotation as well. For that reason, the shortest distance between the disk lower surface and the optical pickup 101 mounted to this optical disk apparatus, which is generally referred to as a slim drive, is generally set to about 1 mm. Incidentally, in this embodiment, an ACT cover portion of the main cover 134 illustrated in FIG. 7, which covers a portion of the objective lens actuator 108, protrudes most to the optical disk 110 side, and the distance thereof is set to about 0.9 mm. Furthermore, the distance between the disk lower surface and the other components of the main cover 134 is set to about 1.2 mm.

Comparing the cases of FIGS. 10A and 10B with the cases of FIGS. 11A and 11B, it can be seen that in the cases illustrated in FIGS. 11A and 11B where both the heat generating sources are thermally connected to the one and the same heat radiation member, a large interference is caused between the heat distribution of the main cover 134, due to the heat generation of the LD 103 and the heat distribution of the main cover 134, due to the heat generation of the LD 133, when compared with the cases of FIGS. 10A and 10B. Furthermore, it can be seen from FIGS. 10C and 11C that, in the case of the large interference of the thermal distribution, a portion of a high temperature is present over a wide range in the main cover 134, which corresponds to the LD 103, even when the air-cooling by the rotation of the optical disk 110 is utilized.

Table 2 below shows the analysis results of the temperature rise of the LD 103 and the LD holder 131 according to this analysis. In Table 2, Analysis 1 represents the state illustrated in FIGS. 10A to 10C in accordance with the embodiment of the present invention, and Analysis 2 represents the state illustrated in FIGS. 11A to 11C, and values shown in Table 2 represent proportions of the temperature rise in Analysis 2 with the value of the temperature rise in Analysis 1 for each of the components being taken as a reference.

TABLE 2

| | Temperature rise [%] | |
| --- | --- | --- |
| | LD | LD holder |
| Analysis 1 | 0 | 0 |
| Analysis 2 | 5 | 10 |

It can be seen from the above results that in the case of the large interference of the thermal distribution, the heat radiation performance of the LD holder 131 is reduced, with the result that the temperature of the LD 103 itself is largely increased. Accordingly, it can be seen that the present invention is more effective than the first conventional example in reduction of the temperature increase of the light source.

Incidentally, the above-mentioned effect is not limited to the analysis conditions described above. It can clearly be seen that the same effect is obtained under different conditions, including a disk format, a disk diameter, a rotation number, and the like.

Figure 12A:
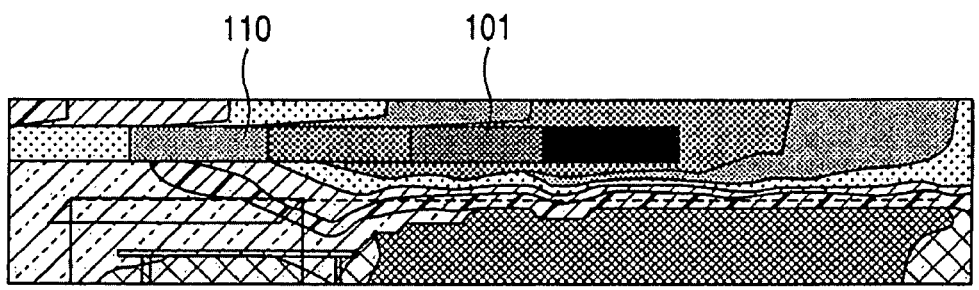
FIGS. 12A and 12B are diagrams for illustrating flow rate distribution, between the optical pickup and an optical disk, of an air flow caused by a rotation of the optical disk, in the optical pickup in FIG. 8.
Figure 12B:
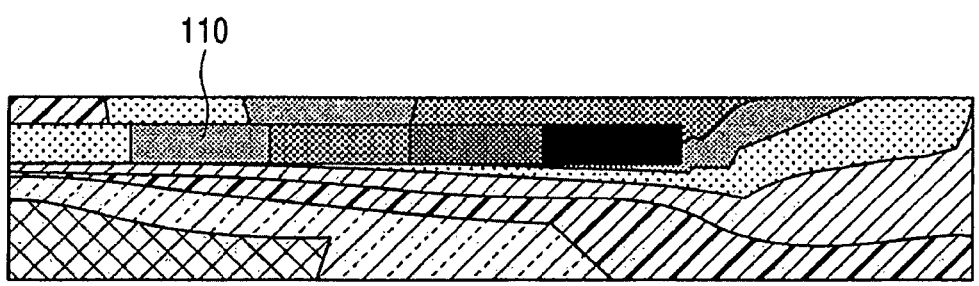
Figure 12B:
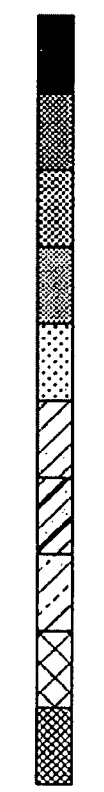

FIGS. 12A and 12B illustrate analysis results of a flow rate distribution of air flow generated by the rotation of the optical disk 110 in an atmosphere surrounding the optical pickup 101. FIG. 12A illustrates a flow rate distribution in a cross section perpendicular to the disk surface of the optical disk 110 in a case wherein the optical pickup 101 is present. On the other hand, FIG. 12B illustrates a flow rate distribution in a case wherein the optical pickup 101 is absent. Incidentally, in FIGS. 12A and 12B, the cross section of the optical disk 110 is also depicted using different patterns and brightnesses for indication of the flow distribution. This does not indicate the flow rate distribution of the air flow, but indicates the rotational speed of the optical disk 1120. Furthermore, in FIG. 12A, a surface of the optical disk 110 side of the main cover 134 is depicted with a chain line as a reference.

As is also seen from FIGS. 12A and 12B, when the optical pickup 101 is present and the case when the optical pickup 101 is absent are compared with each other, it can be seen that when a gas passes above the optical pickup 101, an area having a higher flow rate can be made to expand in an outer peripheral direction of the optical disk 110. This is caused by the characteristics of the atmosphere as a fluid. As described above, in the thin optical pickup, the shortest distance between the disk lower surface and the optical pickup 101 is almost determined, whereby the above-mentioned flow rate distribution can be obtained in a substantially similar way even when the structure of the optical pickup is changed.

Accordingly, when the above-mentioned window portion 134e is disposed under the area having the higher flow rate, the heat radiation of the first heat radiation member can be suitably realized. As a matter of course, when the second heat radiation member is also disposed under the area having the higher flow rate, in addition to the first heat radiation member, a greater heat radiation effect can be obtained.

As the results of the studies based on the above analyses, it has been found that an excellent heat radiation effect is obtained when the window portion 134e is disposed in the vicinity of an outer edge of the optical disk 110 having a radius of 40 mm, for example, in a region having a radius of from 35 mm to 45 mm, that is, within plus or minus 5 mm, from the outer edge thereof. It can be seen from FIG. 12A that this region substantially coincides with the region ranging up to −30% of the highest rate of the flow rate (that is, rotational speed of the outermost periphery of the recording track of the optical disk 110) in a direction parallel to the disk surface of the optical disk 110. The two-dot chain line D of FIG. 8 indicates the region having a radius of 45 mm. As is seen from FIG. 8, most of the window portion 134e, which forms a hole of this embodiment, falls within the region within ±5 mm from the outer edge of the optical disk 110. Particularly, most of the LD 103 and the LD holder 131 exposed from the window portion 134e fall within the region with ±5 mm from the outer edge of the optical disk 110. Incidentally, more specifically, the center F of the LD holder 131 and the LD 103 shown in FIG. 8 is located at a position of a radius of 43 mm, which is substantially equal to the center of the window portion 134e. Furthermore, the length G of the window portion 134e is set to 7 mm. In addition, in this embodiment, in order to arrange the LD 103, the LD holder 131, and the window portion 134e in the above-mentioned positions, there is used the structure in which an angle θ of FIG. 8 formed by an optical axis extending from the LD 103 to the deflecting mirror 105 and a transfer direction of the optical pickup 101 is set to eighty degrees, the transfer direction being determined by the main shaft 126.

Here, for comparison with the second conventional example, Table 3 below shows results of actual measurements of the temperature rise of the LD 103 with the use of the optical disk apparatus 121 shown in this embodiment. Sample 1 of Table 3 is the optical pickup 101 in the state of FIG. 8 in accordance with this embodiment. Sample 2 is obtained by removing, from the structure of Sample 1, the thermal conductive sheet 135 and the portion of the main cover 134 abutting on the thermal conductive sheet 135 to thereby make the LD 103 and the LD 133 opposite to the optical disk 110 side. In order to make the LD 103 and the LDD 133 opposite to the optical disk 110 side, it is desirable to expose the LD 103 and the LDD 133 with respect to the optical disk 110. With this structure, the air-cooling effect can be enhanced more. Furthermore, when the air-cooling effect described above can be obtained to some extent, there is no problem even when some components or members are present between the optical disk 110 and the LD 103 or the LDD 133.

Accordingly, Sample 2 can be considered to be in the same state as that when the laser device 22 and the driver device 23 are exposed to the disk-shaped recording medium 21 side, which is described for the second conventional example. Other experimental conditions for Samples 1 and 2 are the same as those of the analysis conditions for the above-mentioned heat distribution, and the temperature rise of the atmosphere surrounding LD 103 at that time is determined by a thermocouple. The values shown in Table 3 represent a proportion of the temperature rise of Sample 2 with the maximum value of the temperature rise of Sample 1 in accordance with the embodiment of the present invention being taken as a reference.

TABLE 3

| Sample | Temperature rise [%] |
| --- | --- |
| 1 | 0 |
| 2 | 15 |

It can be seen from the above results that the present invention is more effective than the second conventional example in reduction of the temperature rise of the light source.

Figure 13:
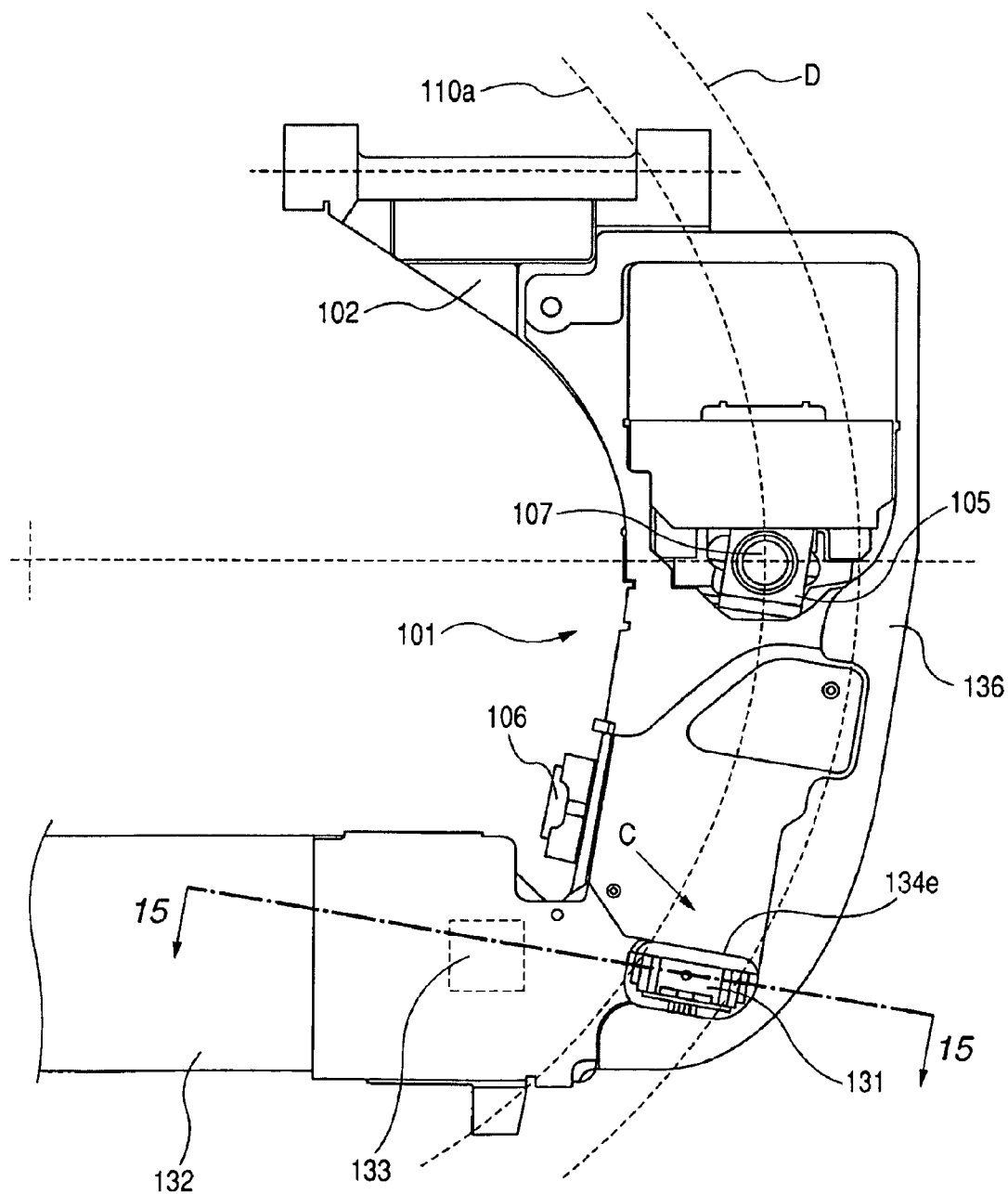
FIG. 13 is a fourth front view illustrating a state in which a resin cover is mounted to the optical pickup of FIG. 8.

FIG. 13 is a fourth detailed front view of a state where a resin cover 136, which is a protection portion for protecting the optical disk 110, is mounted to the optical pickup 101 illustrated in FIG. 8. Further, FIG. 14 is a side view viewed from the sub-shaft 127 side.

Figure 14:
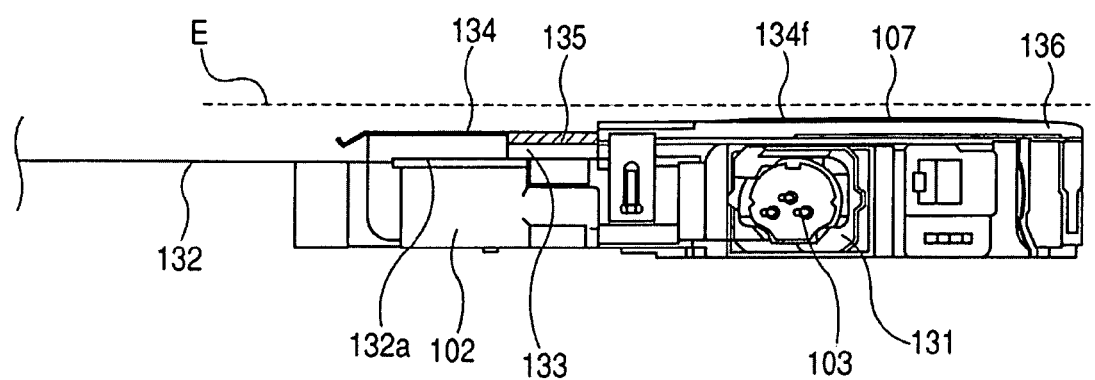
FIG. 14 is a side view of the optical pickup of FIG. 13.

The resin cover 136 is, as illustrated in FIGS. 13 and 14, formed so as to cover edge portions of the optical base 102 and of the main cover 134, which correspond to the outer periphery of the optical disk 110, and is positioned with respect to the main cover 134 by using, as guides, molded cover positioning holes 134c provided to the main cover 134. After that, the resin cover 136 is firmly fixed to the main cover 134 by thermal welding or bonding. With this structure, an edge portion of a metal component mounted to the optical pickup 101 on the outer periphery side of the optical disk 110 is prevented from protruding to the optical disk 110 side, with the result that the optical disk 110 is protected from the edge portion of the metal component. This is especially effective in a self-chucking system, which is typical in a product of a disk camcorder, in which a user is allowed to attach or to detach the optical disk 110 to or from the spindle motor 123, directly. Specifically, even when the user tilts the optical disk 110 at a time of attaching or detaching the optical disk 110 to or from the spindle motor 123, the optical disk 110 can be prevented from being scratched by allowing the optical disk 110 to abut on the resin component. For example, in this embodiment, when the optical disk 110 is attached or detached, the optical pickup 101 is previously moved to the innermost periphery side of the optical disk 110 with the feed motor 125. This movement can limit a region where an edge portion of the optical disk 110 possibly abuts on the resin component at the time of the attachment or detachment of the optical disk 110 only to the outer periphery side, and the effect of the resin cover 136 as the protecting portion is exhibited. As a matter of course, the resin cover 136 can be formed so as to cover an edge portion of the main cover 134 on the inner periphery side of the optical disk 110 and edge portions of all metal components possibly abutting on the optical disk 110 in the optical pickup 101, including the main shaft side and the sub-shaft side.

Furthermore, as illustrated in FIG. 13, the resin cover 136 is formed so as to expose the proximity of the LDD 133, serving as the heat generating source, for the main cover 134, serving as the second heat radiation member, in the disk projection surface. With this structure, the heat radiation performance of the second heat radiation member is assured.

Furthermore, the resin cover 136 is formed along a side end portion of the window portion 134e provided to the main cover 134 on the outer periphery side of the optical disk 110, with the window portion 134e being exposed.

Figure 15:
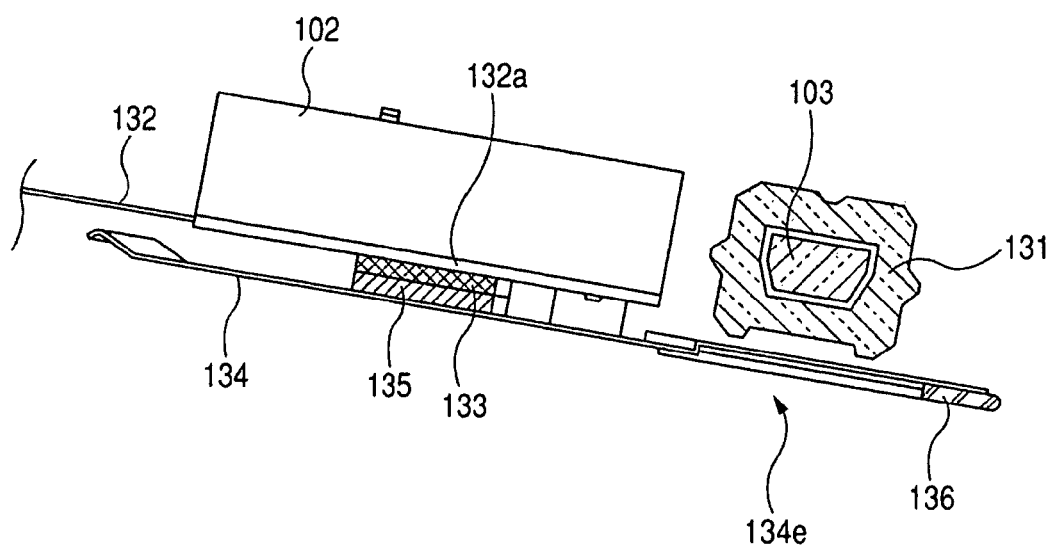
FIG. 15 is a sectional view taken along the line 15-15 of the optical pickup of FIG. 13.
Figure 16:
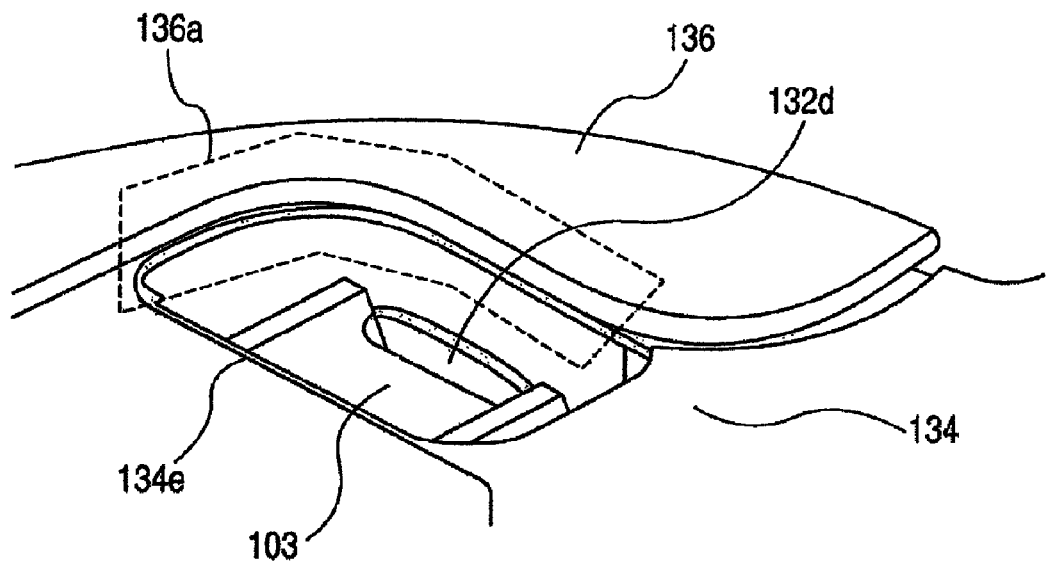
FIG. 16 is an enlarged perspective view illustrating a vicinity of the window portion of FIG. 13.
Figure 17:
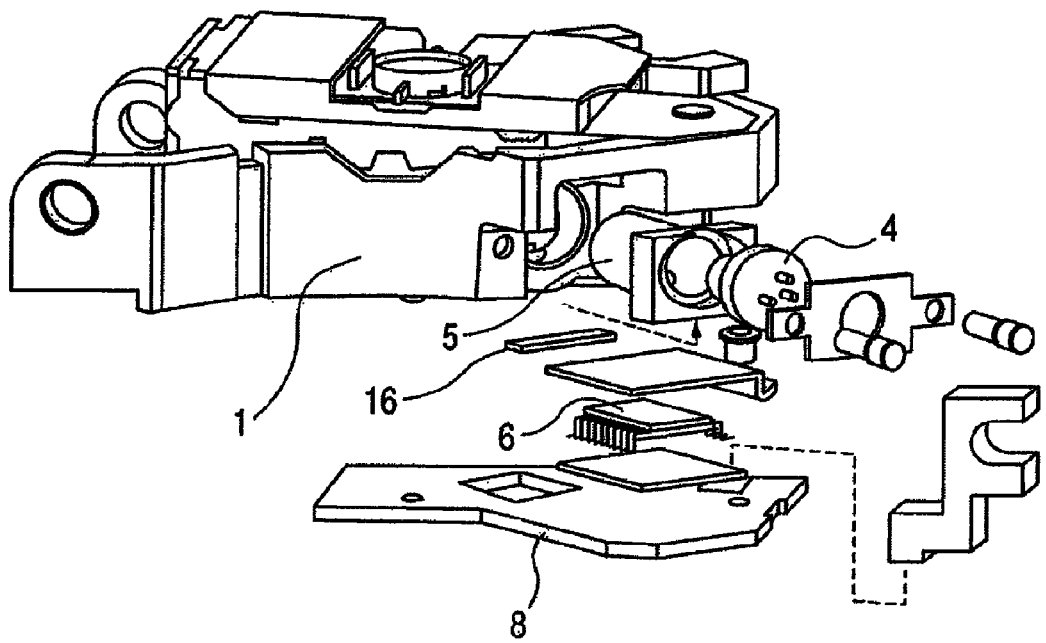
FIG. 17 is a perspective view illustrating a developed state of a heat radiation mechanism according to a first conventional example.
Figure 18:
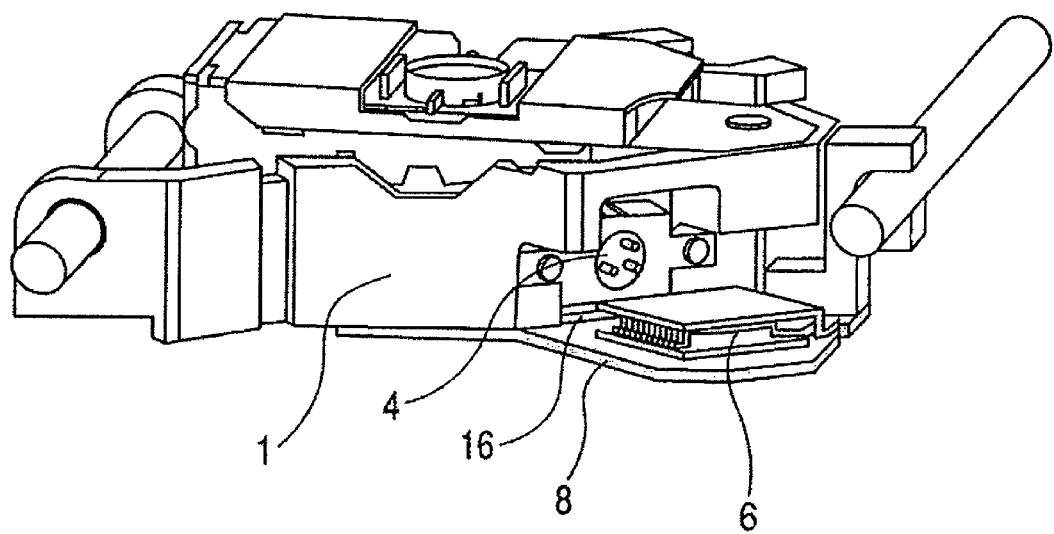
FIG. 18 is a perspective view illustrating an assembly completed state in accordance with a first conventional example.
Figure 19:
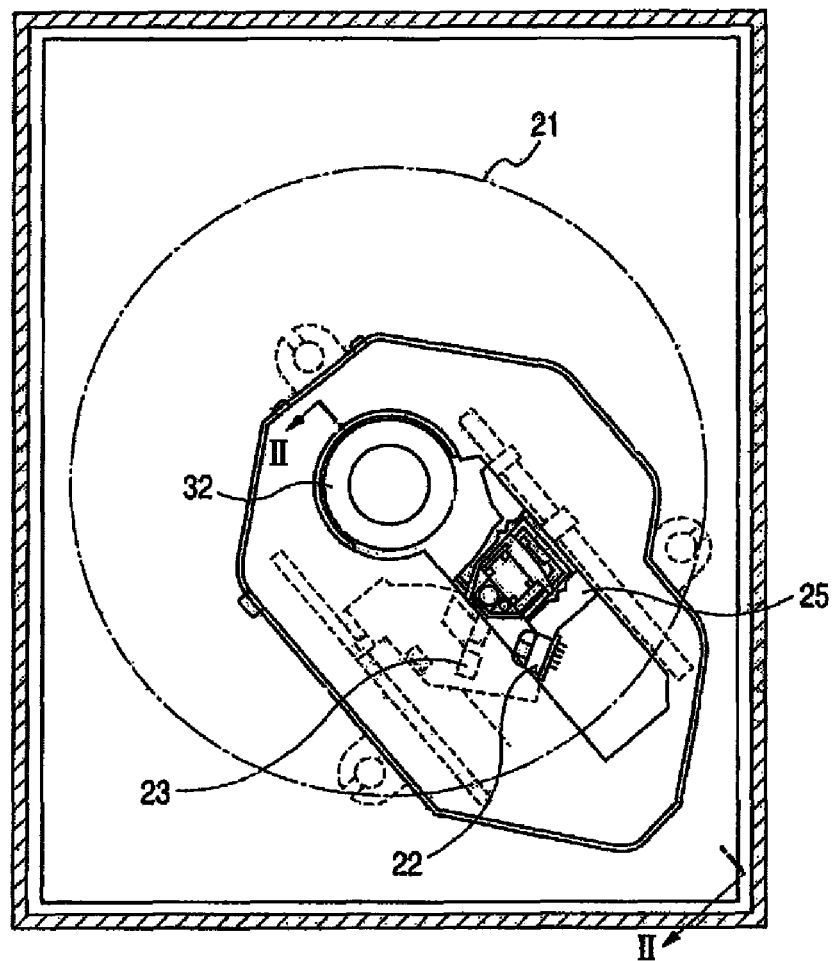
FIG. 19 is a schematic view illustrating an optical disk apparatus in accordance with a second conventional example.
Figure 19:

FIG. 15 is a sectional view taken along line 15-15 of the front view illustrated in FIG. 13, and FIG. 16 is a perspective view viewed in the direction indicated by an arrow C in FIG. 13. Incidentally, in FIG. 15, components unnecessary for the description, for example, the third LD conductive portion 132d of the EPC 132 are not shown.

As illustrated in FIGS. 15 and 16, a window outer edge portion 136a of the resin cover 136, which is formed along a side end portion of the window portion 134e on the outer periphery side of the optical disk 110, is formed so as to protrude in a direction toward the optical disk 110, when compared with the main cover 134 in the same portion.

With this structure, the above-mentioned air flow generated due to the rotation of the optical disk 110 can be led to the LD holder 131 side, the LD holder 131 serving as the first heat radiation member. More specifically, the air flow generated due to the rotation of the optical disk 110 collides with the window outer edge portion 136a of the resin cover 136 and is led to the window portion 134e, whereby the heat radiation performance of the LD holder 131, serving as the first heat radiation member, can be further improved.

As described above, the temperature rise of the LD 103 can be reduced, and there can be provided an optical disk apparatus in which the lifetime of a light source is increased, the degradation of signal quality is reduced to a reduction of an increase of quantum noise, and the reduction of a slope effect is reduced.

Incidentally, in this embodiment, as illustrated in FIG. 16, the window outer edge portion 136a of the resin cover 136 is flush with the side and portion of the window portion 134e on the outer periphery side of the optical disk 110. However, for example, even when a portion of the resin cover 136 protrudes above the window portion 134e in the disk projection surface, the effect of the present invention can also be obtained. This is because the air flow, which has collided with the window outer edge portion 136a, is led to the window portion 134e, when a window portion is formed in a lower side of the window outer edge portion 136a of the resin cover 136. Incidentally, in this case, the "hole" as one of the characteristic features of the present invention corresponds to an area defined by the window portion 134e of the main cover 134 and the window outer edge portion 136a of the resin cover 136 in the disk projection surface. In this case, it is desirable to dispose the hole in the vicinity of the outer edge of the optical disk 110, for example, within ±5 mm from the outer edge, based on the above-mentioned analysis results of the flow rate distribution.

Figure 20:
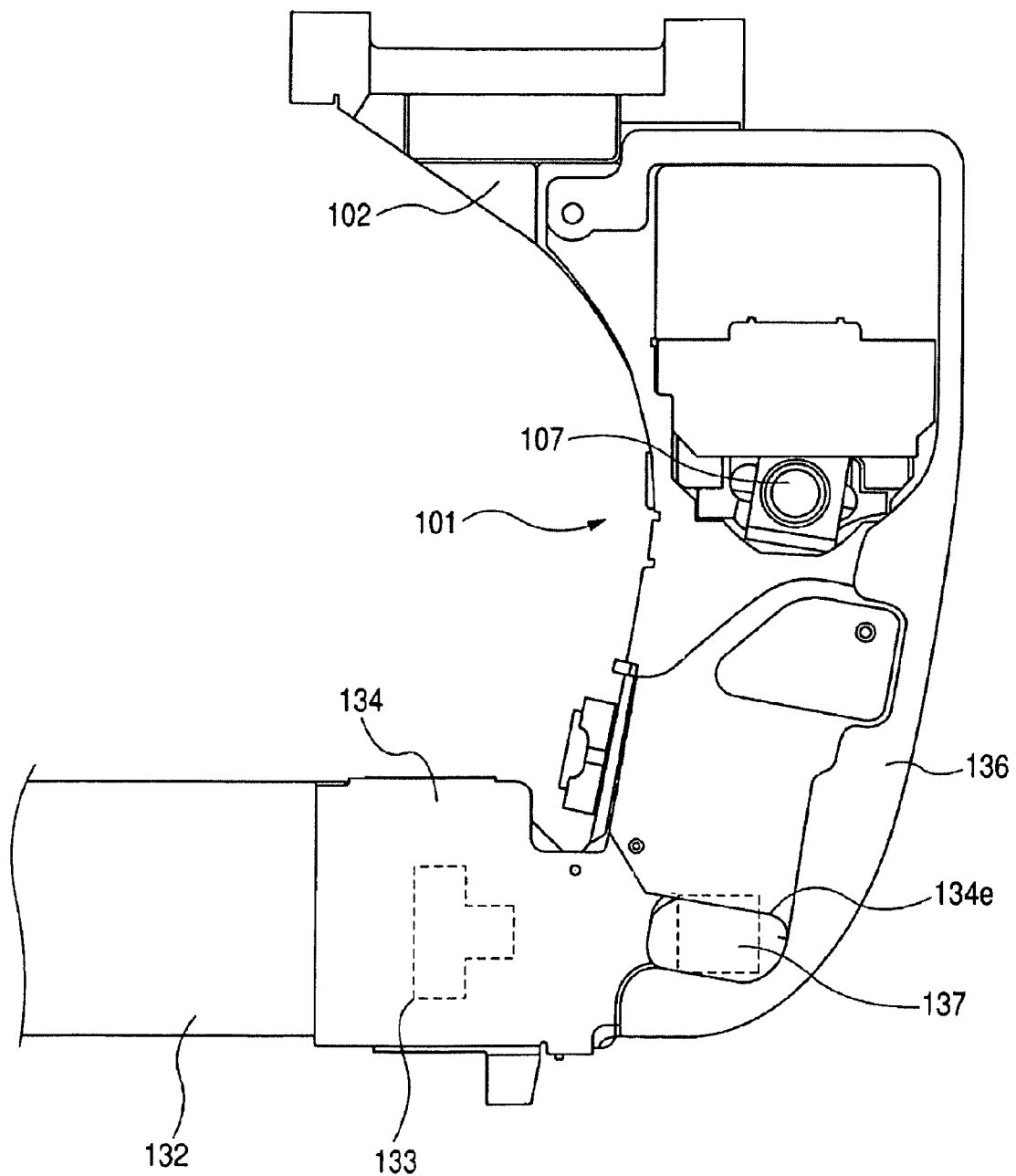
FIG. 20 is a fifth front view illustrating a case wherein positions of the LD and the LDD are exchanged with each other in the optical pickup of FIG. 13.

Incidentally, the present invention is not limited to only the structures of the above described embodiments. For example, though it is necessary to change the arrangement of the optical system described above, as illustrated in FIGS. 20 and 21, the position of the LD 103, serving as the first heat generating source, and the position of the LDD 133, serving as the second heat generating source, can be exchanged with each other.

Figure 21:
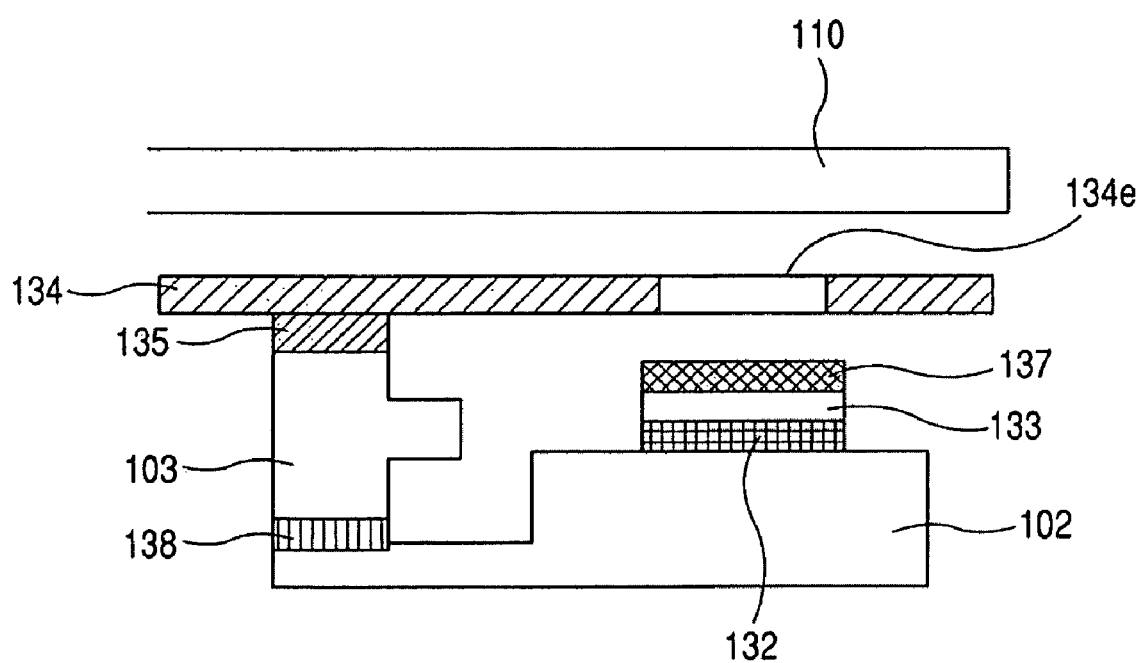
FIG. 21 is a schematic cross-sectional view of the optical pickup of FIG. 20.

FIG. 21 is a schematic cross-sectional view for illustrating the positional relation of the respective heat generating sources and heat radiation members in the thickness direction of the optical pickup 101. In this case, a first heat radiation member connected to the LD 103 serving as the first heat generating source is disposed on a disk-shaped recording medium side with respect to a second heat radiation member connected to the LDD 133, serving as the second heat generating source.

More specifically, the LD 103, serving as the first heat generating source, is thermally connected to the main cover 134, serving as the first heat radiation member, through an intermediation of a thermal conductive sheet 135. Incidentally, the thermal connection can be obtained by using, for example, a thermal conductive grease instead of the thermal conductive sheet 135 between the LD 103 and the main cover 134. Further, for the purpose of improving the operability in the adjustment step, it is possible to firmly fix the LD 103 to a holder member formed by die-casting, or the like, and to thermally connect the holder member to the main cover 134 with a thermal conductive grease, or the like. On the other hand, on an LDD 133, there is disposed an LDD heat radiation plate 137 having the same outer shape as that of the LDD 133 in the disk projection surface. Incidentally, as a heat radiation member of the LDD 133, there can be disposed a heat sink formed by, for example, die-casting, instead of sheet metal. Furthermore, a window portion 134e is formed as the hole in a main cover 134 and exposes most of the LDD heat radiation plate 137.

Moreover, as illustrated in FIG. 21, a heat insulating material 138 for the LD is disposed between the LD 103, serving as the first heat generating source, and the optical base 102, whereby the thermal conductivity with respect to the optical base 102 can be reduced and the temperature rise of the optical base 102 can be reduced. Incidentally, in this case, as illustrated in FIG. 21, the thermal conductivity with respect to the optical base 102 may be reduced by disposes an FPC 132 between the LDD 133 serving as the second heat generating source and the optical base 102.

According to the above-mentioned structure, the effect of the present invention can be obtained even when the position of the LD 103 and the position of the LDD 133 are exchanged with each other. Further, the material of the heat radiation member can be changed.

In addition, as the heat insulating material, a heat insulating component, such as a polyimide tape, can be separately provided instead of the FPC 132.

Furthermore, the angle θ can be set to be other than eighty degrees.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical disk apparatus comprising:
   a light source for emitting a light flux;
   a light source drive circuit for causing the light source to emit the light flux;
   an optical base having an optical system disposed thereon, the optical system comprising an objective lens for guiding the light flux emitted from the light source to a disk-shaped recording medium;
   a moving mechanism for moving the optical base;
   a first heat radiation member connected to the light source; and
   a second heat radiation member connected to the light source drive circuit and being different from the first heat radiation member,
   wherein the first heat radiation member and the second heat radiation member are provided so as to face the disk-shaped recording medium, and
   wherein the first heat radiation member is disposed on the disk-shaped recording medium side with respect to the second heat radiation member, and the first heat radiation member has a hole provided therein, for exposing the second heat radiation member to the disk-shaped recording medium.

2. The optical disk apparatus according to claim 1, wherein when a center of the objective lens is located at an outermost periphery of a track of the disk-shaped recording medium, a center of the hole of the first heat radiation member is located in a vicinity of an outer edge of the disk-shaped recording medium.

3. The optical disk apparatus according to claim 1, wherein the first heat radiation member has a protecting portion provided at an end portion thereof corresponding to an outer periphery side of the disk-shaped recording medium.

4. The optical disk apparatus according to claim 3, wherein the protecting portion is provided so as to protrude from the hole toward the disk-shaped recording medium.

5. An optical disk apparatus comprising:
   a light source for emitting a light flux;
   a light source drive circuit for causing the light source to emit the light flux;
   an optical base having an optical system disposed thereon, the optical system comprising an objective lens for guiding the light flux emitted from the light source to a disk-shaped recording medium;
   a moving mechanism for moving the optical base;
   a first heat radiation member connected to the light source; and
   a second heat radiation member connected to the light source drive circuit and being different from the first heat radiation member,
   wherein the first heat radiation member and the second heat radiation member are provided so as to face the disk-shaped recording medium, and
   wherein the second heat radiation member is disposed on the disk-shaped recording medium side with respect to the first heat radiation member, and the second heat radiation member has a hole provided therein, for exposing the first heat radiation member to the disk-shaped recording medium.

6. The optical disk apparatus according to claim 5, wherein when a center of the objective lens is located at an outermost periphery of a track of the disk-shaped recording medium, a center of the hole of the second heat radiation member is located in a vicinity of an outer edge of the disk-shaped recording medium.

7. The optical disk apparatus according to claim 5, wherein the second heat radiation member has a protecting portion provided at an end portion thereof corresponding to an outer periphery side of the disk-shaped recording medium.

8. The optical disk apparatus according to claim 7, wherein the protecting portion is provided so as to protrude from the hole toward the disk-shaped recording medium.

9. An optical pickup comprising:
   a light source for emitting a light flux;
   a light source drive circuit for causing the light source to emit the light flux;
   an optical base having an optical system disposed thereon, the optical system comprising an objective lens for guiding the light flux emitted from the light source to a disk-shaped recording medium;
   a first heat radiation member connected to the light source; and
   a second heat radiation member connected to the light source drive circuit and being different from the first heat radiation member,
   wherein the first heat radiation member and the second heat radiation member are provided so as to face the disk-shaped recording medium, and
   wherein the first heat radiation member is disposed between the disk-shaped recording medium and the second heat radiation member, and the first heat radiation member has a hole provided therein, for exposing the second heat radiation member to the disk-shaped recording medium.

10. The optical pickup according to claim 9, wherein the first heat radiation member has a protecting portion provided at an end portion thereof corresponding to an outer periphery side of the disk-shaped recording medium.

11. The optical pickup according to claim 10, wherein the protecting portion is provided so as to protrude from the hole toward the disk-shaped recording medium.

12. An optical pickup comprising:
   a light source for emitting a light flux;
   a light source drive circuit for causing the light source to emit the light flux;
   an optical base having an optical system disposed thereon, the optical system comprising an objective lens for guiding the light flux emitted from the light source to a disk-shaped recording medium;
   a first heat radiation member connected to the light source; and a second heat radiation member connected to the light source drive circuit and being different from the first heat radiation member, wherein the first heat radiation member and the second heat radiation member are provided so as to face the disk-shaped recording medium, and wherein the second heat radiation member is disposed between the disk-shaped recording medium and the first heat radiation member, and the second heat radiation member has a hole provided therein, for exposing the first heat radiation member to the disk-shaped recording medium.

13. The optical pickup according to claim 12, wherein the second heat radiation member has a protecting portion provided at an end portion thereof corresponding to an outer periphery side of the disk-shaped recording medium.

14. The optical pickup according to claim 13, wherein the protecting portion is provided so as to protrude from the hole toward the disk-shaped recording medium.

\* \* \* \* \*